(12) United States Patent
Yamamoto et al.

(10) Patent No.: US 9,902,256 B2
(45) Date of Patent: Feb. 27, 2018

(54) VEHICULAR SHUTTER DEVICE

(71) Applicant: SHIROKI CORPORATION, Fujisawa-shi (JP)

(72) Inventors: Kenji Yamamoto, Fujisawa (JP); Shinya Watanabe, Fujisawa (JP); Kazuya Yokoyama, Fujisawa (JP)

(73) Assignee: SHIROKI CORPORATION, Fujisawa-Shi, Kanagawa (JP)

( * ) Notice: Subject to any disclaimer, the term of this patent is extended or adjusted under 35 U.S.C. 154(b) by 0 days.

(21) Appl. No.: 15/311,480

(22) PCT Filed: May 13, 2015

(86) PCT No.: PCT/JP2015/063757
§ 371 (c)(1),
(2) Date: Nov. 15, 2016

(87) PCT Pub. No.: WO2015/178268
PCT Pub. Date: Nov. 26, 2015

(65) Prior Publication Data
US 2017/0080794 A1 Mar. 23, 2017

(30) Foreign Application Priority Data

May 19, 2014 (JP) .................. 2014-103290
May 19, 2014 (JP) .................. 2014-103291

(51) Int. Cl.
*B60R 19/52* (2006.01)
*B60K 11/08* (2006.01)
*B60K 11/04* (2006.01)

(52) U.S. Cl.
CPC ............ *B60K 11/085* (2013.01); *B60K 11/04* (2013.01); *B60R 19/52* (2013.01); *B60R 2019/525* (2013.01); *Y02T 10/88* (2013.01)

(58) Field of Classification Search
CPC ....... B60K 11/085; B60K 11/04; B60R 19/52; B60R 2019/525
(Continued)

(56) References Cited

U.S. PATENT DOCUMENTS

| | | | |
|---|---|---|---|
| 5,732,666 A * | 3/1998 | Lee .................. | F01P 7/026 123/41.05 |
| 8,662,569 B2 * | 3/2014 | Klop .................. | B60K 11/085 180/68.1 |

(Continued)

FOREIGN PATENT DOCUMENTS

| | | |
|---|---|---|
| FR | 2 825 326 A1 | 12/2002 |
| JP | 2008-260447 A | 10/2008 |

(Continued)

OTHER PUBLICATIONS

International Search Report (ISR) (PCT Form PCT/ISA/210), in PCT/JP2015/063757, dated Jul. 14, 2015.

*Primary Examiner* — Jason S Morrow
*Assistant Examiner* — E Turner Hicks
(74) *Attorney, Agent, or Firm* — McGinn LP Law Group, PLLC.

(57) ABSTRACT

A vehicular shutter device includes: a frame portion; a fin main body that is pivotably supported inside the frame portion to be pivotable around a pivot shaft portion; and a driving mechanism that pivots the fin main body between a fully open state and a fully closed state. The pivot shaft portion is provided to one of the frame portion and the fin main body, a shaft receiving portion is provided to an other of the frame portion and the fin main body to pivotably support the pivot shaft portion, one of the pivot shaft portion and the shaft receiving portion is provided at a position offset from the fin main body having a plate shape, and the pivot shaft portion and the shaft receiving portion are
(Continued)

located at both ends and an intermediate part, in the horizontal direction of the fin main body.

18 Claims, 9 Drawing Sheets

(58) Field of Classification Search
USPC .............. 296/193.1, 208; 293/115; 180/68.1, 180/68.2, 68.3, 68.4, 68.5
See application file for complete search history.

(56) References Cited

U.S. PATENT DOCUMENTS

| | | | |
|---|---|---|---|
| 8,919,470 B2 * | 12/2014 | Hori | B60K 11/085 180/68.1 |
| 9,162,562 B2 * | 10/2015 | Bourqui | B60K 11/085 |
| 9,168,828 B2 * | 10/2015 | Bourqui | F16H 19/08 |
| 2006/0073781 A1 * | 4/2006 | Mochizuki | B60H 1/3421 454/152 |
| 2010/0282438 A1 | 11/2010 | Wirth et al. | |
| 2013/0103265 A1 * | 4/2013 | Remy | B60K 11/085 701/49 |
| 2015/0020758 A1 | 1/2015 | Hosono et al. | |

FOREIGN PATENT DOCUMENTS

| | | |
|---|---|---|
| JP | 2010-260542 A | 11/2010 |
| JP | 2012-224153 A | 11/2012 |
| JP | 2013-136260 A | 7/2013 |

* cited by examiner

VEHICULAR SHUTTER DEVICE

TECHNICAL FIELD

The present invention relates to a vehicular shutter device and specifically relates to a vehicular shutter device capable of changing conditions of air to be introduced into a radiator or the like.

BACKGROUND ART

An opening is provided at a lower front of a vehicle to feed air to a radiator or the like, and thus overheating of an engine is suppressed.

However, if the opening is opened at all times, there is a concern that aerodynamic performance of the vehicle is reduced. Additionally, a temperature in an engine room hardly rises at the time of warming-up, and thus fuel efficiency deteriorates. In addition, fuel efficiency deteriorates due to excessive cooling of the engine at high-speed running.

Thus, techniques such as a Patent Literatures 1 and 2 in which a shutter device including fins, which is configured to open and close an opening thereof as necessary, is provided to improve aerodynamic performance or fuel efficiency, are known.

CITATION LIST

Patent Literature

Patent Literature 1: Japanese Unexamined Patent Application Publication No. 2013-136260
Patent Literature 2: Japanese Unexamined Patent Application Publication No. 2012-224153

SUMMARY OF INVENTION

Technical Problem

In the vehicular shutter device, a plurality of fins is provided inside a frame. Each of the fins is a single plate-shaped member. Thus, each of the fins can close a large area in a fully closed state, and a sealing rate is enhanced.

In such a vehicular shutter device, since the fin is supported only by both ends in a longitudinal direction, there is a concern that the fin is bent in the longitudinal direction.

An object of the present invention is to provide a vehicular shutter device, in which a sealing rate is high and fins, are supported with high rigidity.

Solution to Problem

A vehicular shutter device according to the present invention that is configured to adjust the amount of air to be flowed into an inside from an outside surface a vehicle, includes: a frame portion that is attached to the vehicle; a fin main body that is pivotably supported inside the frame portion to be pivotable around a pivot shaft portion extending in a horizontal direction; and a driving mechanism that pivots the fin main body between a fully open state and a fully closed state. The pivot shaft portion is provided to one of the frame portion and the fin main body, a shaft receiving portion is provided to an other of the frame portion and the fin main body to pivotably support the pivot shaft portion, one of the pivot shaft portion and the shaft receiving portion is provided at a position offset from the fin main body having a plate shape, and the pivot shaft portion and the shaft receiving portion are located at both ends and an intermediate part in the horizontal direction of the fin main body.

According to the vehicular shutter device of the present invention, since the fin main body is supported at both ends and the intermediate parts thereof, the fin has high support rigidity. Further, since either one of the pivot shaft portion and the shaft receiving portion is provided at the position offset from the fin main body, it is not necessary to provide a clearance intended to avoid interference between the fin main body and the pivot shaft portion or the shaft receiving portion in the fully closed state, and the sealing rate is high in the fully closed state.

In the vehicular shutter device according to the present invention, the shaft receiving portion may include an accommodating space that pivotably accommodates the pivot shaft portion; and an insertion port that is formed to insert the pivot shaft portion into the accommodating space in such a manner that a part of a wall forming the accommodating space is cut out. Since the pivot shaft portion is inserted into the accommodating space of the shaft receiving portion from the insertion port, the fin main body can be easily attached to the frame portion, and the assembly becomes easy.

According to the vehicular shutter device of the present invention, since the interference between fin main body and the shaft receiving portion does not occur in the fully closed state, a sealing degree is improved in the fully closed state.

In the vehicular shutter device according to the present invention, the frame portion may include an intermediate wall provided at an intermediate part in the horizontal direction inside an opening, the intermediate wall may include a pair of plate-shaped walls that are spaced from each other in the horizontal direction and extend in the vertical direction, and the pivot shaft portion or the shaft receiving portion located at the intermediate part in the horizontal direction may be provided over the pair of plate-shaped walls.

According to the vehicular shutter device of the present invention, since there is a clearance between the pair of plate-shaped walls, even when the intermediate walls are provided, an opening ratio is less likely to decrease. In addition, when the frame portion is molded with a resin, the frame portion can be easily molded because the intermediate wall is thin.

In the vehicular shutter device according to the present invention, in a cross-section orthogonal to an axial direction of the pivot shaft portion, the pivot shaft portion may include a long diameter and a short diameter, and the long diameter may be larger than an opening width of the insertion port, and the short diameter may be not orthogonal to an insertion-and-removal direction of the pivot shaft portion during a normal operation state in which the fin main body pivots between the fully open state and the fully closed state.

According to the vehicular shutter device of the present invention, the pivot shaft portion is hard to deviate from the shaft receiving portion.

In the vehicular shutter device according to the present invention, the fin main body may include a cover that is located in front of the pivot shaft portion or the shaft receiving portion at the time of the fully open state and covers the pivot shaft portion or the shaft receiving portion.

According to the vehicular shutter device of the present invention, dust or the like contained in the air easily intrudes into the accommodating space from the insertion port during the fully open state, but intrusion of the dust can be suppressed by the cover.

The vehicular shutter device according to the present invention may be a vehicular grill shutter that is provided at a front of an engine room to adjust the amount of the air to be flowed into the engine room of the vehicle.

In the vehicular shutter device according to the present invention a plurality of the fins may be vertically arranged inside the frame portion, and a fin, located at the lowermost side in a vertical direction, among the plurality of fins may have higher rigidity than other fins.

The inventors have found, as a result of study on scattering of water droplets or mud, that the water droplets or mud intensively collide with the lowermost fin and the water droplets or mud are relatively unlikely to collide with the other fins.

According to the vehicular shutter device of the present invention, the lowermost fin has higher rigidity than the other fins. The lowermost fin has high rigidity so as to withstand collision of the water droplets or mud, and the opening ratio is hardly reduced by the other fins. For this reason, the vehicular shutter device is provided in which the opening ratio is large and a risk of damage is low.

In the vehicular shutter device according to the present invention, the fin located at the lowermost side may have plate shape, and, in a cross-section orthogonal to an axial direction of the pivot shaft portion, an intermediate portion of the fin located at the lowermost side may protrude in a thickness direction than both ends thereof.

According to the vehicular shutter device of the present invention, the fin located at the lowermost side is formed to not have a uniform plate shape and have an uneven shape, thereby increasing the rigidity of the fin.

In the vehicular shutter device according to the present invention, the vehicular shutter device may further include a link mechanism that transmits a driving force of the driving mechanism to the plurality of fins such that the plurality of the fins are synchronously moved, wherein the fin located at the lowermost side among the plurality of the fins may be coupled to an output shaft of the driving mechanism, and the other fins may be coupled to the link mechanism.

According to the vehicular shutter device of the present invention, since the fin located at the lowermost side and having highest rigidity is coupled to a driving shaft to which a large output of the motor is transmitted, this is a reasonable configuration.

In the vehicular shutter device according to the present invention, the link mechanism may include a first link that is coupled to one end in the horizontal direction of the plurality of fins, and a second link that is coupled to the other end in the horizontal direction of the plurality of fins.

According to the vehicular shutter device of the present invention, the plurality of fins are supported at both ends in the horizontal direction by the first link and the second link, and the link mechanism can the plurality of fins with high support rigidity.

Advantageous Effects of Invention

According to the present invention, a vehicular shutter device is provided, in which an opening ratio is large and a risk of damage is low even when a vehicle enters a puddle.

DESCRIPTION OF EMBODIMENTS

A vehicular shutter device 1 according to an embodiment of the present invention will be described in detail below with reference to the accompanying drawings. The vehicular shutter device 1 is configured to adjust the inflow rate of air from the outside surface to the inside of a vehicle. The vehicular shutter device 1 according to the present embodiment is provided at a lower front of the vehicle to be capable of introducing air into an engine room, and functions as a vehicular grill shutter for changing the amount of air to be introduced into the engine room.

Figure 1:
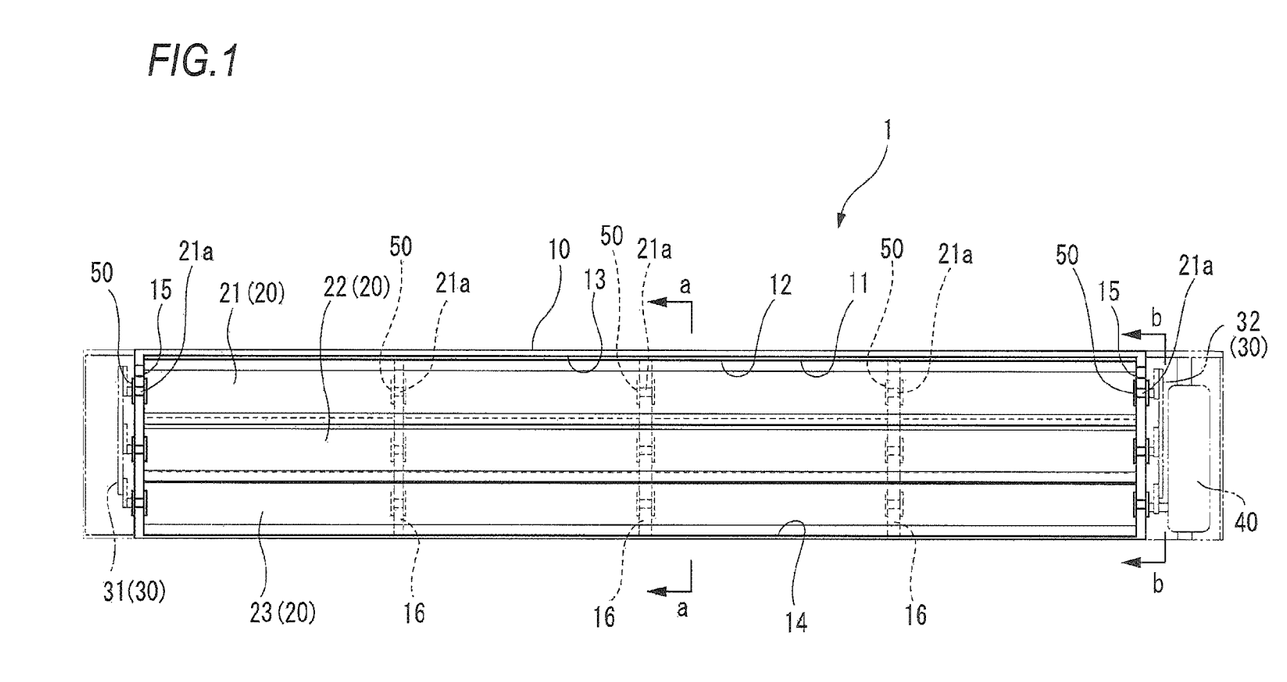
FIG. 1 is a front view of a vehicular shutter device according to an embodiment of the present invention.

FIG. 1 is a front view of the vehicular shutter device 1. As illustrated in FIG. 1, the vehicular shutter device 1 includes a frame 10 (an example of a frame portion) having an opening 11 that is opened frontwards and a plurality of fins 20 (three fins being illustrated in the drawing as an example) that are vertically arranged inside the opening 11. The fins 20 have pivot shaft portions 21a, 22a, and 23a (see FIGS. 2A and 2B) extending in a horizontal direction and are pivotably supported by the frame 10. The plurality of fins 20 rotate around the pivot shaft portions 21a, 22a, and 23a, and thereby it possible to change an opening ratio of the opening 11 and adjust the amount of air to be introduced into the engine room.

The vehicular shutter device 1 further includes a link mechanism 30 and a motor 40. The motor 40 has an output shaft 41 and drives the plurality of fins 20 to be open and close. The link mechanism 30 transmits a driving force of the motor 40 to the plurality of fins 20 such that the plurality of fins 20 is synchronously moved. The link mechanism 30 includes a first link 31 coupled to one ends in the horizontal direction of the plurality of fins 20 and a second link 32 coupled to the other ends in the horizontal direction of the plurality of fins 20. Thus, the link mechanism 30 supports both ends of the fins 20 in the horizontal direction and supports the fins 20 with high support rigidity.

The vehicular shutter device 1 is attached to the vehicle in a posture in which the opening 11 of the frame 10 faces the front. The frame 10 is attached to the vehicle. In this embodiment, the frame 10 is attached to the front of the vehicle. The frame 10 includes an inner peripheral surface 12 that forms the opening 11 and has a rectangular shape as viewed from the front. The inner peripheral surface 12 is configured with a top wall 13, a bottom wall 14, and sidewalls 15. The opening 11 has a rectangular shape that is horizontally long and flat as viewed from the front.

In this embodiment, three intermediate walls 16 are horizontally arranged inside the opening 11. Each of the intermediate walls 16 extends to the bottom wall 14 from the top wall 13 in a vertical direction. The opening 11 is divided into four sections in the horizontal direction by the intermediate wall 16 as viewed from the front. Three fins 20 are arranged in a longitudinal direction with respect to each of the sections. Each of the fins 20 is pivotably supported at five points in total including both ends in the horizontal direction and three points therebetween.

As illustrated in FIG. 1, the vehicular shutter device 1 includes a upper fin 21 located at a uppermost side in the vertical direction, a lower fin 23 located at a lowermost side, and a middle fin 22 located in the middle of the upper fin 21 and the lower fin 23. The upper fin 21 and the middle fin 22 have a common shape. In the following description, the upper fin 21, the middle fin 22, and the lower fin 23 are collectively referred to as a fin 20.

Figure 2A:
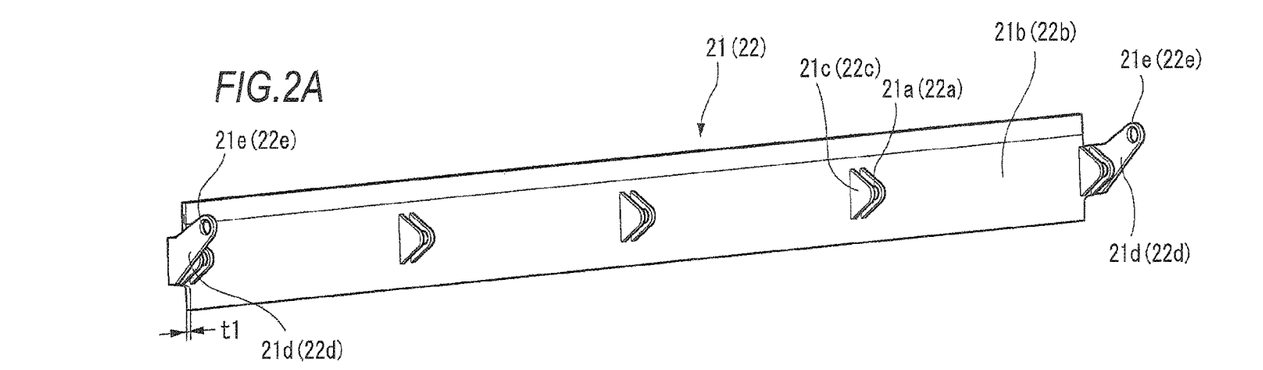
FIGS. 2A and 2B are perspective views illustrating a fin.
Figure 2B:
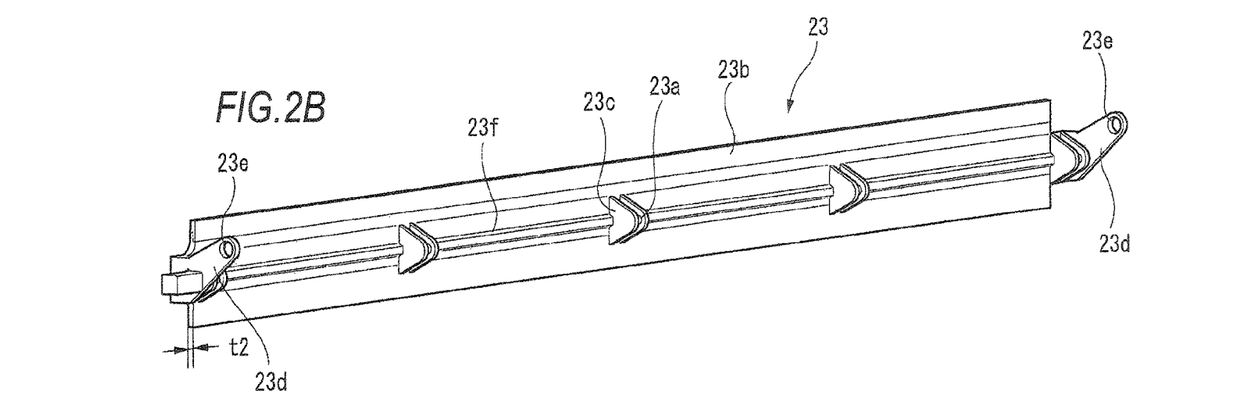

FIGS. 2A and 2B are perspective views illustrating the fin 20. FIG. 2A illustrates the upper fin 21 and the middle fin 22, and FIG. 2B illustrates the lower fin 23.

As illustrated in FIG. 2A, each of the upper fin 21 and the middle fin 22 is a long member that extends in a transverse direction. The upper fin 21 and the middle fin 22 include the pivot shaft portions 21a and 22a extending in the transverse direction, planar plate portions 21b and 22b (an example of a fin main body, respectively) extending in the transverse direction, connection portions 21c and 22c, and link coupling portions 21d and 22d, respectively.

The connection portions 21c and 22c are formed to a shape protruding from the plate portions 21b and 22b, and the pivot shaft portions 21a and 22a are provided at tips of the connection portions 21c and 22c. In this way, the pivot shaft portions 21a and 22a are respectively provided at positions offset from the plate portion 21b of the upper fin 21 and the plate portion 22b of the middle fin 22. The pivot shaft portions 21a and 22a are provided at positions offset from back surfaces of the plate portions 21b and 22b. The back surfaces of the plate portions 21b and 22b are surfaces facing a downstream side in the introduction direction of air in a fully closed state.

The pair of link coupling portions 21d and 22d is provided at both longitudinal ends of the plate portions 21b and 22b. The link coupling portions 21d and 22d are formed to a shape protruding from the plate portions 21b and 22b, and coupling holes 21e and 22e are formed at different positions from the pivot shaft portions 21a and 22a on tips of the link coupling portions 21d and 22d.

Similarly, the lower fin 23 is a long member extending in the transverse direction. As illustrated in FIG. 2B, the lower fin 23 includes a pivot shaft portion 23a extending in the transverse direction, a planar plate portion 23b extending in the transverse direction, a connection portion 23c, and link coupling portions 23d.

The connection portion 23c is formed to have a shape protruding from the plate portion 23b, and the pivot shaft portion 23a is provided at a tip of the connection portion 23c. In this way, the pivot shaft portion 23a is provided at a position offset from the plate portion 23b of the lower fin 23. The pivot shaft portion 23a is provided at a position offset from a back surface of the plate portion 23b. The back surfaces of the plate portions 23b is a surface facing the downstream side in the introduction direction of air in the fully closed state.

The pair of link coupling portions 23d is provided at both longitudinal ends of the plate portion 23b. The link coupling portions 23d are formed to have a shape protruding from the plate portion 23b, and coupling holes 23e are respectively provided at different positions from the pivot shaft portion 23a on tips of the link coupling portions 23d.

The plate portion 23b of the lower fin 23 is formed to have a thicker thickness than the plate portions 21b and 22b of the upper fin 21 and the middle fin 22. In addition, a rib 23f extending in the transverse direction is provided in the middle of the plate portion 23b of the lower fin 23 in a width direction (vertical direction). Thus, a rigidity of the lower fin 23 is set to be higher than a rigidity of the upper fin 21 and the middle fin 22.

Furthermore, a thickness t2 of the plate portion 23b of the lower fin 23 is formed to be larger than a thickness t1 of the plate portions 21b and 22b of the upper fin 21 and the middle fin 22.

Figure 3A:
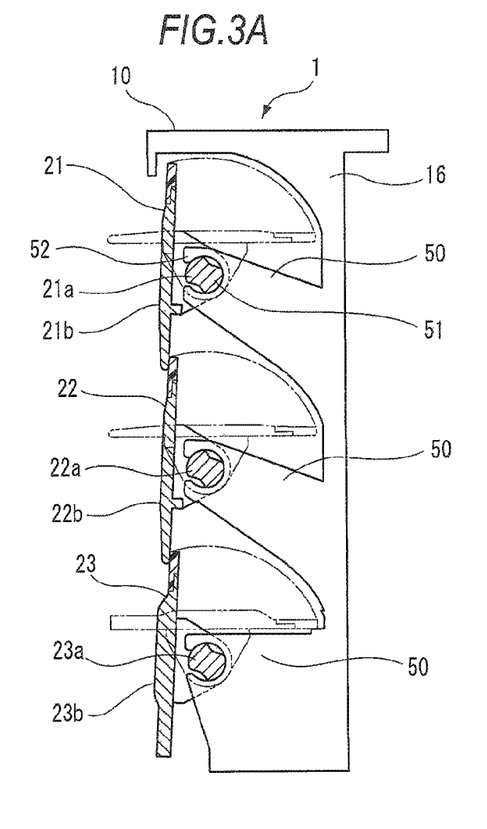
FIGS. 3A and 3B are cross-sectional views of the vehicular shutter device.
Figure 3B:
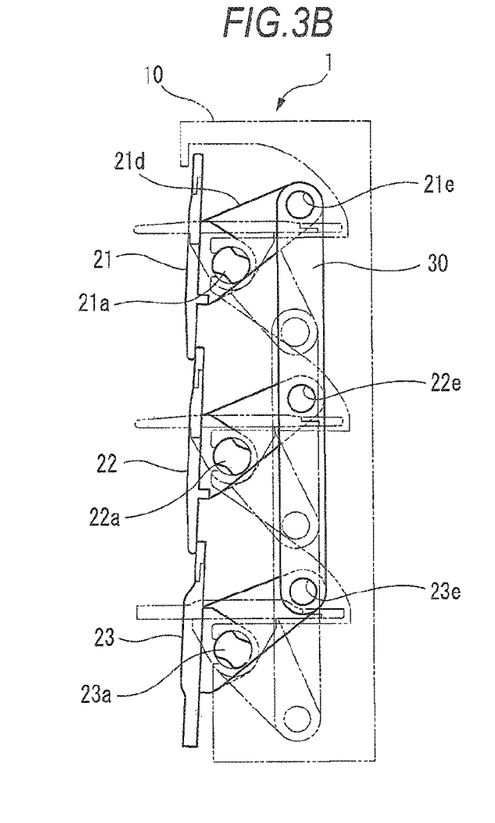

FIGS. 3A and 3B are cross-sectional views of the vehicular shutter device 1 in a cross-section orthogonal to an axial direction of the pivot shaft portion. FIG. 3A is a view taken along line a-a in FIG. 1. FIG. 3B is a view taken along line b-b in FIG. 1.

As illustrated in FIG. 3A, the frame 10 includes shaft receiving portions 50 that pivotably support the fins 20 around the rotating shafts extending in the horizontal direction. In the shaft receiving portion 50, an accommodating space 51 is formed in a substantially columnar shape such that the pivot shaft portions 21a to 23a of the fins 20 are pivotably accommodated. The accommodating space 51 is formed by a wall. The accommodating space 51 includes an insertion port 52 that is formed in such a manner that a part of the wall (a part of the front in this example) forming the accommodating space 51 is cut out. The insertion port 52 is configured to insert the pivot shaft portions 21a, 22a, and 23a of the fins 20 into the accommodating space 51. The vehicular shutter device 1 can be assembled in such a manner that the pivot shaft portions 21a, 22a, and 23a of the fins 20 are inserted into the accommodating space 51 through the insertion port 52 from the front.

The shaft receiving portions 50 are provided at three intermediate walls 16 and left and right sidewalls 15 of the frame 10. For this reason, since one fin 20 is supported at five points in total including two points of both longitudinal ends and three points therebetween, it is possible to reduce rigidity required in the longitudinal direction of the fin 20. Thus, it is possible to reduce the thickness of the fin 20 and increase the opening ration when being in an open state.

The longitudinal ends supporting the fin 20 refer to portions located at longitudinal ends of the fin 20 compared to a longitudinal center of the fin 20, and does not refer to only end edge.

As illustrated in FIG. 3B, the fins 20 are coupled to the link mechanism 30 through the link coupling portions 21d to 23d. The link mechanism 30 is driven in the vertical direction by the motor 40. Thus, the fins 20 rotate around the pivot shaft portions 21a to 23a. In FIGS. 3A and 3B, a posture of the fin 20 in the fully closed state where the opening 11 is fully closed by the fin 20 is indicated by a solid line, and a posture of the fin 20 in the fully open state where the opening 11 is opened and channel resistance due to the fin 20 is smallest is indicated by two-dot chain line. The motor 40 causes the fin 20 to rotate between the fully open state and the fully closed state.

(Accommodating Space and Pivot Shaft Portion)

Figure 4:
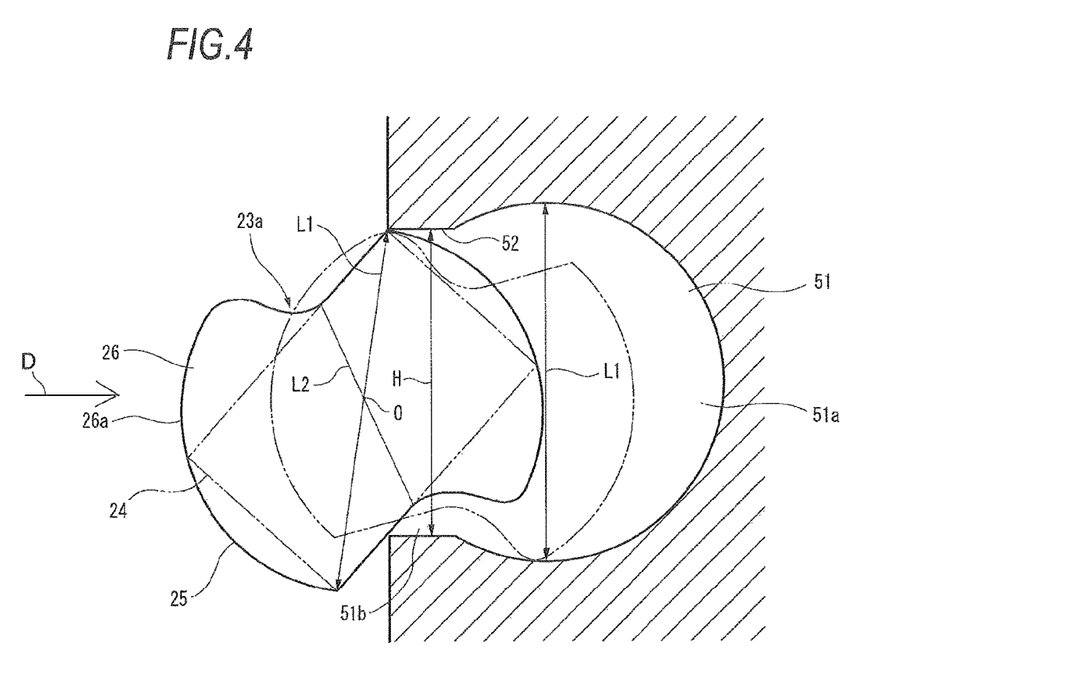
FIG. 4 is an enlarged view of a pivot shaft portion and an accommodating space.

FIG. 4 is an enlarged view of the pivot shaft portion 23a and the accommodating space 51 when the lower fin 23 is inserted into the accommodating space 51 of the shaft receiving portion 50. In the following description, the lower fin 23 will be described in detail and the description of the upper fin 21 and the middle fin 22 will not be presented because the upper fin 21, the middle fin 22, and the lower fin 23 have the pivot shaft portion of the same structure.

As illustrated in FIG. 4, the accommodating space 51 includes a part 51a of circle with a diameter L1 and a rectangular space 51b forming the insertion port 52 in the cross-section orthogonal to the axial direction of the pivot shaft portion 23a. The diameter L1 is larger than a length (opening width) H of the insertion port 52 in an opening direction in which the insertion port faces the vertical direction. The insertion port 52 is provided at the front of the accommodating space 51, and the pivot shaft portion 23a of the lower fin 23 is inserted backward from the front of the accommodating space 51. In this embodiment, that is, an insertion-and-removal direction D of the lower fin 23 with respect to the accommodating space 51 is a front and back direction.

As illustrated in FIG. 4, the pivot shaft portion 23a includes the long diameter L1 and the short diameter L2 in the cross-section orthogonal to the axial direction of the pivot shaft portion 23a. The long diameter L1 is larger than the opening width H of the insertion port 52. In a normal operation state in which the fin 20 pivots between the fully open state and the fully closed state, the direction of the short diameter L2 is not orthogonal to the insertion-and-removal direction D of the pivot shaft portion 23a. The pivot shaft portion 23a has a shape being rotational symmetry around an axial core O.

In this embodiment, the short diameter L2 is shorter than the opening width H of the insertion port 52. The pivot shaft portion 23a is inserted into the accommodating space 51 in such a manner that the pivot shaft portion 23a moves toward the accommodating space 51 while rotating as illustrated in FIG. 4. During the rotation of the pivot shaft portion 23a, the direction of the short diameter L2 that is shorter than the opening width H coincides with the opening direction of the insertion port 52. The lower fin 23 is pushed into the accommodating space 51 while rotating in a state where the direction of the short diameter L2 coincides with the opening direction. Thereby, the pivot shaft portion 23a can be smoothly inserted into the accommodating space 51 as indicated by a chain line in FIG. 4.

Figure 5A:
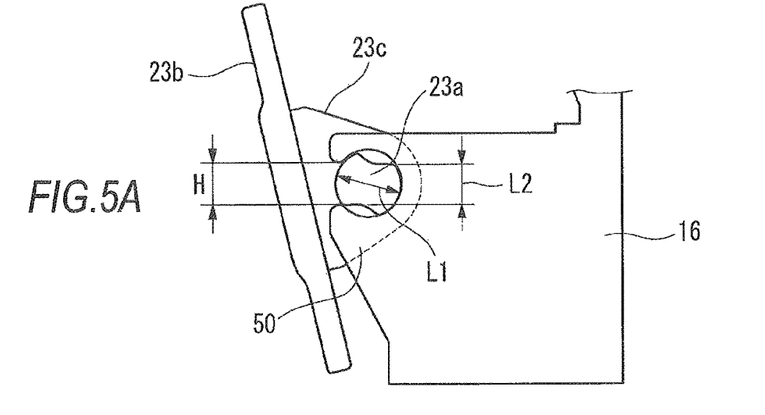
FIGS. 5A to 5C are diagrams illustrating states where the pivot shaft portion pivots.
Figure 5B:
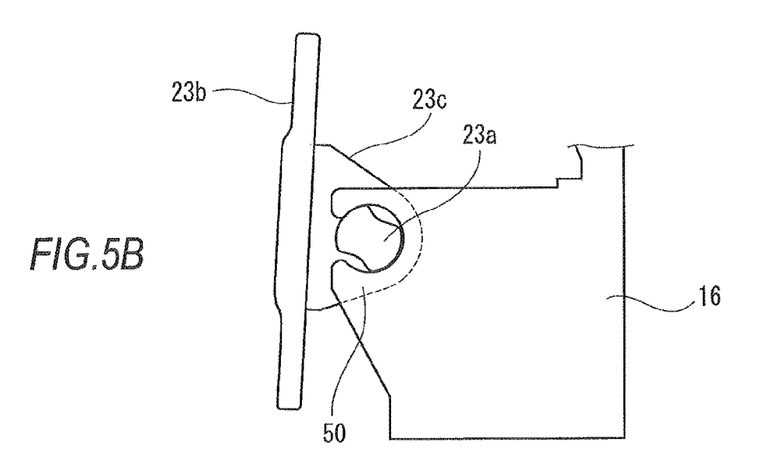
Figure 5C:
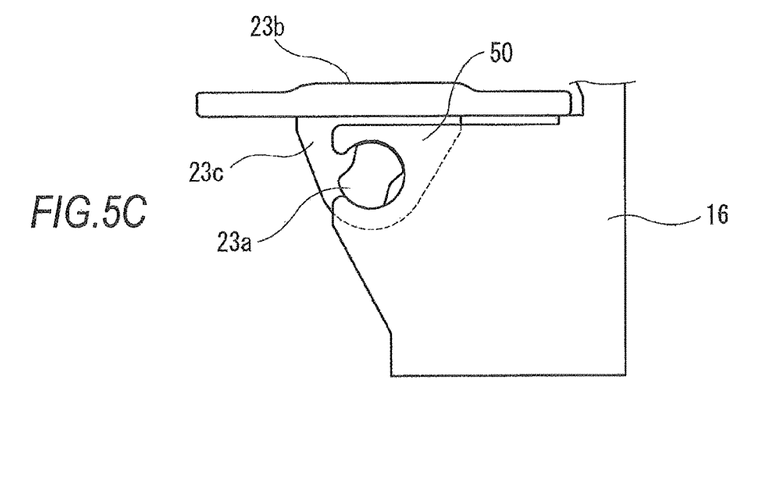

FIGS. 5A to 5C are diagrams illustrating states where the pivot shaft portion 23a pivots in the accommodating space 51. FIG. 5A illustrates a state immediately after the lower fin 23 is attached to the shaft receiving portion 50, FIG. 5B illustrates a fully closed state, and FIG. 5C illustrates a fully open state.

The direction of the short diameter L2 is different from a direction of an extension surface of the plate portion 23b of the lower fin 23. For this reason, during the normal operation state where the lower fin 23 pivots from the fully closed state to the fully open state illustrate in FIGS. 5B and 5C, the direction of the short diameter L2 and the opening direction of the insertion port 52 do not coincide with each other as illustrated in FIG. 5A. That is, the pivot shaft portion 23a of the lower fin 23 is hardly pulled out from the accommodating space 51 in the normal operation state where the vehicular shutter device 1 attached to the vehicle operates.

Thus, according to the vehicular shutter device 1 of this embodiment, the insertion port 52 configured to insert the pivot shaft portion 23a into the accommodating space 51 is formed in such a manner that a part of the wall forming the accommodating space 51 is cut out. For this reason, when the lower fin 23 is inserted into the accommodating space 51, there is no need to bend the lower fin unlike the invention disclosed in JP-A-2013-136260, and the pivot shaft portion 23a can be easily inserted through the insertion port 52. Accordingly, the fins 20 are easily attached to the frame 10.

Furthermore, since the long diameter L1 of the pivot shaft portion 23a is larger than the opening width H of the insertion port 52, the pivot shaft portion 23a is hardly pulled out from the accommodating space 51. In addition, the short diameter L2 of the pivot shaft portion 23a is not orthogonal to the insertion-and-removal direction D of the pivot shaft portion 23a in the normal operation state where the lower fin 23 pivots between the fully open state and the fully closed state. For this reason, the pivot shaft portion 23a is hardly pulled out from the accommodating space 51 in the normal operation state where the vehicular shutter device 1 is normally used.

For these reasons, there is provided the vehicular shutter device 1 in which the fins 20 are hardly detached from the frame 10 and are easily assembled. Although the above description is directed to the lower fin 23, it may be directed to the upper fin 21 and the middle fin 22 in the same way.

Advantageous Effects

As illustrated in FIG. 1, for example, with respect to the upper fin 21, the pivot shaft portions 21a and the shaft receiving portions 50 are located at five points in total including both ends in the horizontal direction and three points therebetween. This is also applied to the middle fin 22 and the lower fin 23. In this way, since the fins 20 are supported at the plurality of points in the longitudinal direction, the fins have high support rigidity with respect to the frame 10. For this reason, the fins 20 are hardly bent even when a high wind pressure acts on the fins 20 or a large impact force acts on the fins 20 due to scattered muddy water. Furthermore, since the fins 20 can be formed into a thin thickness, it is possible to increase the opening ratio of the opening 11 during the fully open state.

Thus, according to the vehicular shutter device 1 of this embodiment, the fins are supported with high rigidity.

One or more of the pivot shaft portions 21a and the shaft receiving portion 50 may be naturally located at the above-described intermediate point in the horizontal direction.

As illustrated in FIGS. 2A to 2B and 3A to 3B, for example, the pivot shaft portion 23a of the lower fin 23 is provided at the tip of the connection portion 23c protruding from the plate portion 23b in the cross-section orthogonal to the axial direction of the pivot shaft portion 23a. Therefore, the pivot shaft portion 23a is provided at the position offset from the plate portion 23b. This is also applied to the upper fin 21 and the middle fin 22.

Unlike this embodiment, when the pivot shaft portion is provided on the surface of the plate portion, it is necessary to provide a clearance between the shaft receiving portion and the fin so as to avoid interference between the shaft receiving portion and the fin, in particular during the fully closed state. For this reason, there is a concern that air passes through the opening 11 even in the fully closed state. However, according to the vehicular shutter device 1 of this embodiment, since the fin 20 and the shaft receiving portion 50 do not interfere with each other, the shaft receiving portion 50 is covered with the fin 20 in a front view and a clearance does not occur in the closed state. Therefore, it is possible to increase a sealing rate of the vehicular shutter device 1.

For these reasons, according to the vehicular shutter device 1 of this embodiment, there is provided the vehicular shutter device in which the sealing rate is high in the fully closed state and the fins are supported with high rigidity.

In this embodiment, the accommodating space 51 of the shaft receiving portion 50 is opened frontwards, as illustrated in FIGS. 3A to 3B. For this reason, even when the fins 20 are pushed by the air passing toward the back from the front in the open state, the back part of the inner surface of the accommodating space 51 reliably supports the pivot shaft portion 21a. Thus, the lower fin 23 is hardly pulled out. Further, since the lower fin 23 can be attached to the shaft receiving portion 50 from the front, it is unnecessary to bend the fins in the longitudinal direction like the related art, and it is possible to easily assemble the vehicular shutter device 1.

As illustrated in FIG. 4, according to the vehicular shutter device 1 of this embodiment, in the cross-section orthogonal to the axial direction of the pivot shaft portion 23a, the long diameter L1 of the pivot shaft portion 23a is equal to the diameter L1 of the circular accommodating space 51, and at least a part of the outer peripheral surface of the pivot shaft portion 23a has a curvature substantially equal to a curvature of the inner peripheral surface, which forms the accommodating space 51 of the shaft receiving portion 50.

Accordingly, since a contact area between the outer peripheral surface of the pivot shaft portion 23a and the inner peripheral surface of the accommodating space 51 increases and the support rigidity becomes higher, the lower fin 23 is easily pivoted in a stable posture. In addition, since a contact pressure hardly increases, wear of the lower fin 23 and the shaft receiving portion 50 can be suppressed.

As illustrated in FIG. 4, this embodiment has a configuration in which the pivot shaft portion 23a includes a first sliding contact surface and a second sliding contact surface coming in sliding contact with the inner surface of the accommodating space 51 in the cross-section orthogonal to the axial direction of the pivot shaft portion 23a. The second sliding contact surface is located to face the first sliding contact surface. As illustrated in FIGS. 5A to 5C, at least a part of these first sliding contact surface and second sliding contact surface ordinarily comes in sliding contact with the inner surface of the accommodating space in a normal operation state. As a result, the pivot shaft portion 23a comes in sliding contact with the inner surface of the accommodating space with a large area in the normal operation state, and the pivot shaft portion 23a is pivotably supported in the accommodating space 51 in a stable manner.

In the cross-section orthogonal to the axial direction of the pivot shaft portion 23a, the first sliding contact surface and the second sliding contact surface are formed in a circular arc shape. The circular arc of the first sliding contact surface and the circular arc of the second sliding contact surface has a curvature equal to the curvature of the inner peripheral surface of the accommodating space 51. Therefore, since the pivot shaft portion 23a comes in contact with the inner peripheral surface of the accommodating space 51 with a large area, the pivot shaft portion 23a is pivotably supported in the accommodating space 51 in a stable manner.

In the cross-section orthogonal to the axial direction of the pivot shaft portion 23a, furthermore, the first sliding contact surface is connected to the second sliding contact surface by a curved surface that is curved to the inside of the pivot shaft portion. When being inserted into the accommodating space 51, the pivot shaft portion 23a rides over the insertion port 52 by the inwardly curved portion. Thus, the pivot shaft portion 23a is easily inserted into the accommodating space 51.

The shape of the pivot shaft portion 23a is not limited to the above-described shape. The pivot shaft portion may be formed by a combination between some curves such as a circle or an ellipse or may be formed by a combination of these some curves with a straight line.

In the above-described embodiment, an example where the short diameter L2 of the pivot shaft portion is smaller than the opening width H of the insertion port 52 in the cross-section orthogonal to the axial direction of the pivot shaft portion is described, but the present invention is not limited to this example. For example, the short diameter L2 of the pivot shaft portion may be set to be larger than the opening width of the insertion port 52. In this case, the pivot shaft portion is pushed into the insertion port 52, and thus the pivot shaft portion is accommodated in the accommodating space 51. As a result, the pivot shaft portion is more hardly pulled out from the accommodating space 51.

In this embodiment, the frame 10 is configured as illustrated in FIG. 1 such that three intermediate walls 16 are provided at an intermediate part in the horizontal direction inside the opening 11.

Figure 6:
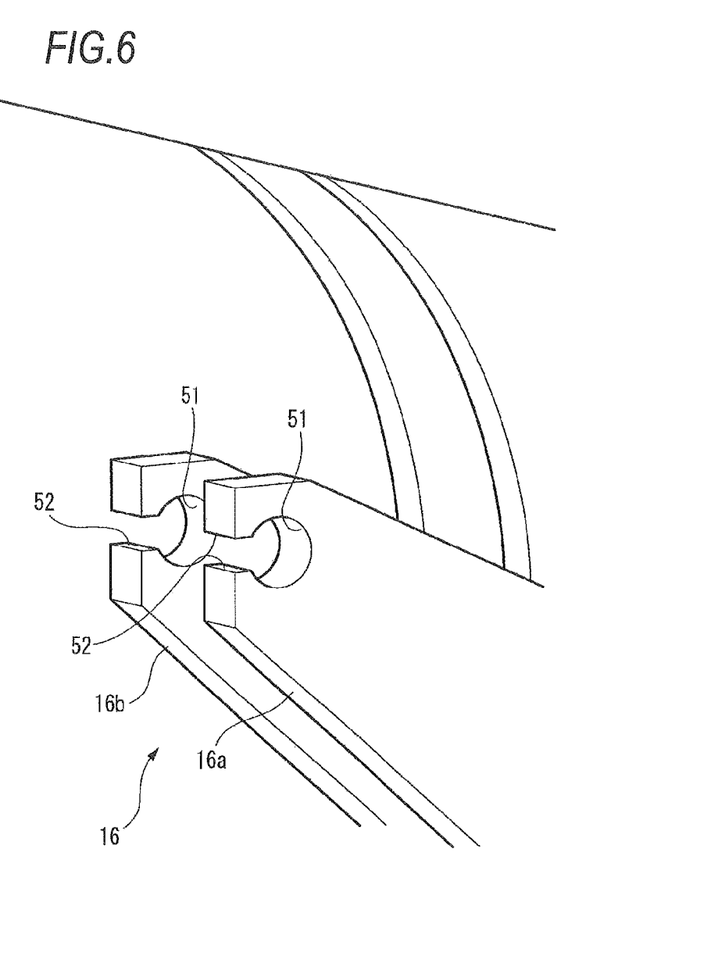
FIG. 6 is an enlarged perspective view illustrating one of intermediate walls.

FIG. 6 is an enlarged perspective view illustrating one of the intermediate walls 16. As illustrated in FIG. 6, the intermediate wall 16 includes a pair of plate-shaped walls 16a and 16b. The pair of plate-shaped walls 16a and 16b is spaced from each other in the horizontal direction, and extends in the vertical direction. The pair of plate-shaped walls 16a and 16b is respectively provided with the accommodating space 51 having the insertion port 52, whereby the shaft receiving portions 50 are formed. The pivot shaft portions 21a, 22a, and 23a provided in the fins 20 are respectively inserted into the accommodating space 51, and are provided over the shaft receiving portions 50 provided in the pair of plate-shaped walls 16a and 16b.

In this way, since there is a clearance between the pair of plate-shaped walls 16a and 16b, even when the intermediate walls 16 are provided in the opening 11, the opening area of the opening 11 is not remarkably reduced. In addition, when the frame 10 is molded with a resin, the intermediate wall 16 can be made thin due to the clearance between the pair of plate-shaped walls 16a and 16b and thus the frame is easily molded.

In the above-described embodiment, an example where the pivot shaft portions 21a, 22a, and 23a are provided in the plate portions 21b, 22b, and 23b to form the fins 20, and the shaft receiving portions 50 are provided in the frame 10 is described, but the pivot shaft portions may be provided in the frame and the shaft receiving portions may be provided in the plate portions (examples of the fin main body).

Figure 7A:
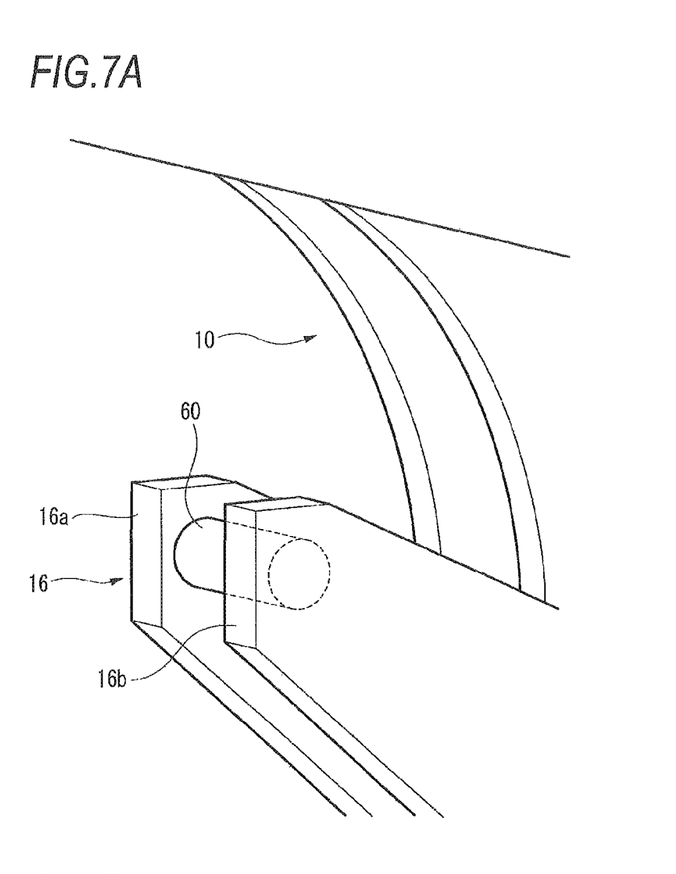
FIGS. 7A and 7B are enlarged views of an intermediate wall according to a modified example of the present invention.
Figure 7B:
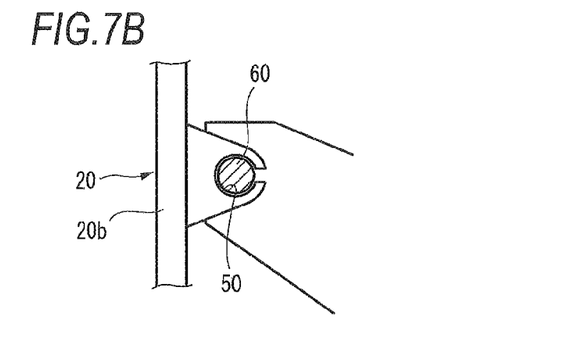

FIGS. 7A and 7B are views according to modified examples of the present invention, wherein FIG. 7A is a view similar to FIG. 6, and FIG. 7B is a view similar to FIG. 5B. As illustrated in FIGS. 7A and 7B, according to this modified example, a pivot shaft portion 60 is provided in a frame 10, and a shaft receiving portion 50 is provided integrally with a plate portion 20b of a fin 20.

In this modified example, in a cross-section orthogonal to the pivot shaft portion 60 illustrated in FIG. 7B, the pivot shaft portion 60 has a shape based on a circle. The pivot shaft portion 60 having such a shape is formed integrally with a plate-shaped walls 16a and 16b of the frame 10. According to such a configuration, the frame 10 is easily formed by resin molding.

The frame 10 has less uneven in a direction along an introduction direction (front and back direction) of air. For this reason, in resin molding, when a mold is pulled out along the introduction direction of air, the frame 10 is easily formed. At this time, when the pivot shaft portion 60 has a cross-section of a circle-based shape, it is easy to be integrally molded the frame 10 with the pivot shaft portion 60.

Thus, according to this modified example, it is possible to obtain a vehicular shutter device having good manufacturing efficiency. The circle-based shape includes, for example, a circular shape, an elliptical shape, a track shape, and a shape obtained by cutting out a part of the outer periphery having these shapes.

Figure 8:
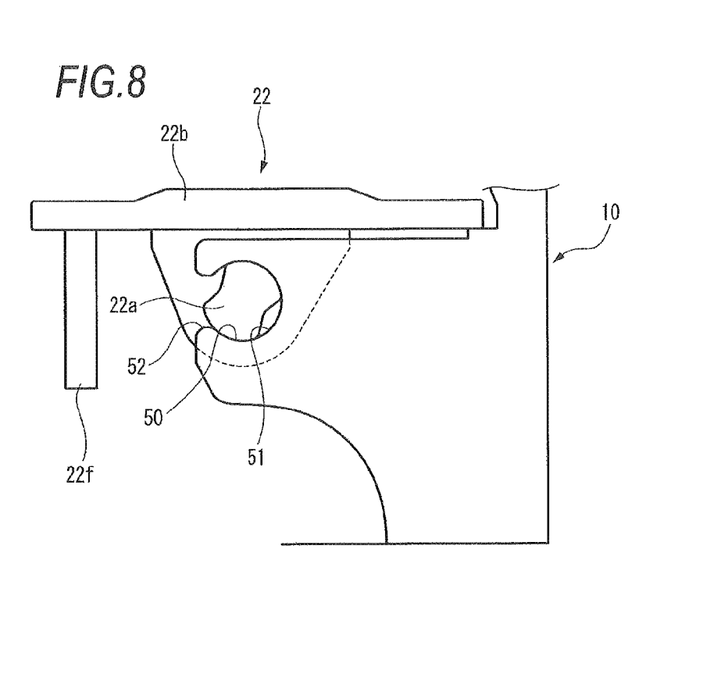
FIG. 8 is an enlarged view of a shaft receiving portion according to another modified example of the present invention.

FIG. 8 is a view illustrating a middle fin 22 of a vehicular shutter device according to another modified example of the present invention. FIG. 8 illustrates the middle fin 22 when the fin 20 is in a fully open state. In this modified example, as illustrated in FIG. 8, a shaft receiving portion 50 is provided in the frame 10, and a pivot shaft portion 22a is provided integrally with a plate portion 22b (an example of a fin main body) of the middle fin 22. An insertion port 52 of the shaft receiving portion 50 is opened to an upstream side of air to be flowed (a front of a vehicular shutter device 1). A cover portion 22f is provided on the plate portion 22b of the middle fin 22 to protrude from the plate portion 22b. The cover portion 22f is located in front of the shaft receiving portion 50 and the pivot shaft portion 22a when the fin 20 is in the fully open state. The cover portion 22f is formed to cover the pivot shaft portion 22a and the insertion port 52 of the shaft receiving portion 50. An example where the cover portion 22f is provided in the middle fin 22 is described, but it may be provided in an upper fin 21 or a lower fin 23.

As in this modified example, when the insertion port 52 is opened to the upstream side of the air to be flowed, there is a concern that dust or the like contained in the air are introduced into the accommodating space 51 through the insertion port 52 during the fully open state. However, since the cover portion 22f covers the insertion port 52 even in the fully open state, it is possible to suppress intrusion of foreign matters from the insertion port 52.

Figure 9:
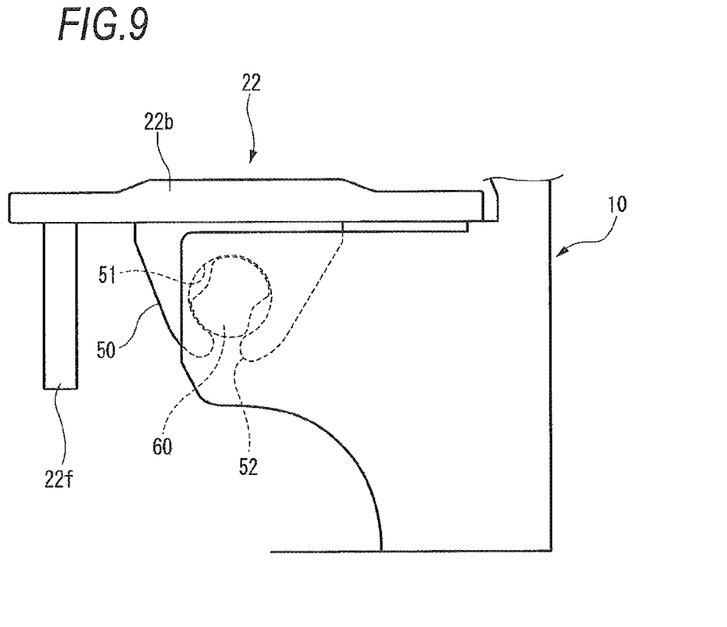
FIG. 9 is an enlarged view of a shaft receiving portion according to further another modified example of the present invention.

FIG. 9 is a view illustrating a middle fin 22 of a vehicular shutter device according to further another modified example of the present invention. FIG. 9 is a view corresponding to FIG. 8.

In this modified example as illustrated in FIG. 9 unlike the example in FIG. 8, a shaft receiving portion 50 is provided integrally with a plate portion 22b (an example of a fin main body) of the middle fin 22, and a pivot shaft portion 60 is provided in a frame 10. An insertion port 52 of the shaft receiving portion 50 is opened downward.

In this modified example, a cover portion 22f is also located in front of the shaft receiving portion 50 and the pivot shaft portion 60 in a fully open state of a fin 20. The cover portion 22f covers the shaft receiving portion 50 and the pivot shaft portion in the fully open state of the fin 20. In such a modified example, the cover portion 22f can also suppress intrusion of foreign matters between the pivot shaft portion 60 and the shaft receiving portion 50.

With reference to FIG. 4, an example where the plurality of fins 20 are arranged in a straight line in the cross-section orthogonal to the axial direction of the pivot shaft portion is described, but the present invention is not limited thereto. For example, the plurality of fins 20 may be vertically arranged in a zigzag or may be vertically arranged in a circular arc shape in this cross-section.

Figure 10:
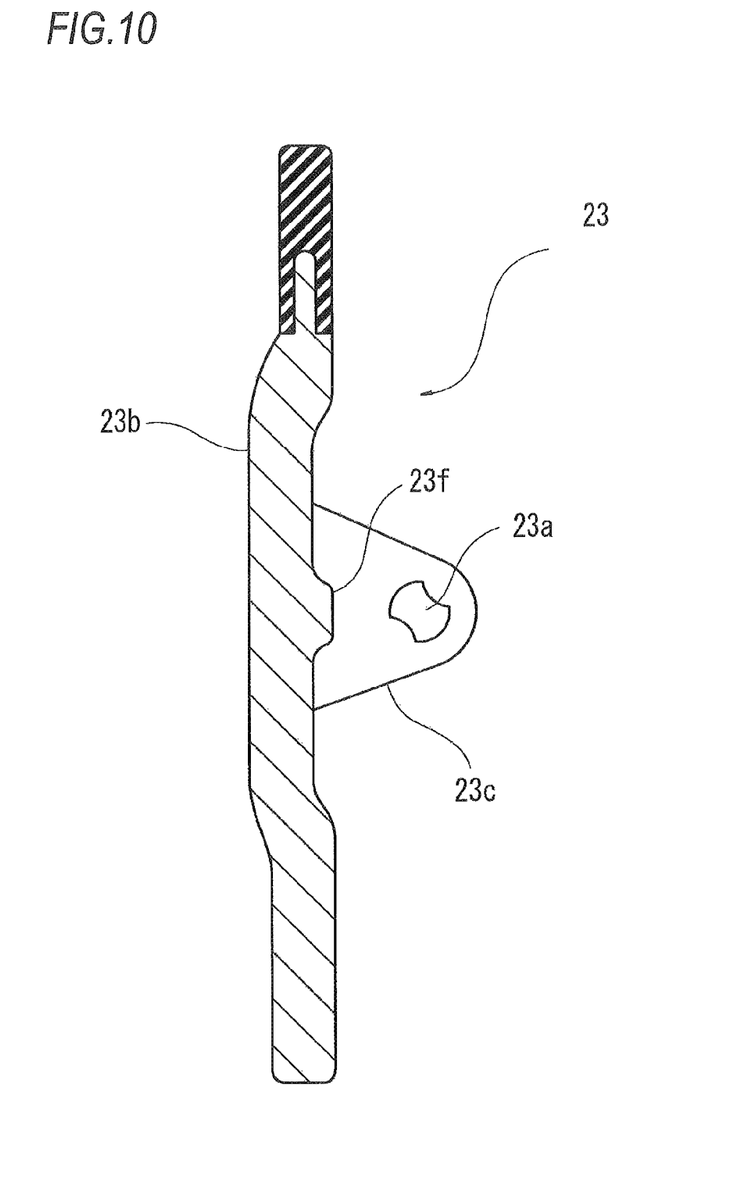
FIG. 10 is a cross-sectional view of the lower fin illustrated in FIGS. 2A and 2B.

FIG. 10 is a cross-sectional view of the lower fins 23 illustrated in FIGS. 2A and 2B. As illustrated in FIG. 10, the plate portion 23b of the lower fin 23 is configured such that a central region in a width direction is shifted to a front (a left side in the drawing) further than both ends. A rib 23f is provided at a central portion in the widthwise central region to protrude backward. The rib 23f is formed to extend in the longitudinal direction. The rib 23f protrudes further in a thickness direction than both ends in the cross-section orthogonal to the axial direction of the pivot shaft portion 23a. Thus, the lower fin 23 is formed in an uneven shape rather than a uniform plate shape. Thereby, rigidity of the lower fin 23 is set to be higher than rigidity of the upper fin 21 and the middle fin 22.

As illustrated in FIG. 3A, the frame 10 includes the shaft receiving portion 50 that pivotably supports the fin 20 around the pivot shaft portion extending in the horizontal direction. In the shaft receiving portion 50, the accommodating space 51 is formed in the substantially columnar shape such that the pivot shaft portions 21a to 23a of the fins 20 are pivotably accommodated.

The shaft receiving portions 50 are provided at three intermediate walls 16 and left and right sidewalls 15 of the frame 10. For this reason, since one fin 20 is supported at five points in total including two points of both longitudinal ends and three points therebetween, it is possible to reduce rigidity required in the longitudinal direction of the fin 20. Thus, it is possible to reduce the thickness of the fin 20 and increase the opening ration when being in the open state. The opening ratio is a ratio of a region not covered with the fin 20, the intermediate wall 16, or the like with respect to the internal region of the opening 11 when the vehicular shutter device in the open state is viewed from the front.

As illustrated in FIG. 3B, the fins 20 are coupled to the link mechanism 30 through the link coupling portions 21d to 23d. The link mechanism 30 is pivotably coupled to the coupling holes 21e, 22e, and 23e of the fins 20. The output shaft 41 of the motor 40 is fixed to the pivot shaft portion 23a of the lower fin 23.

From the closed state indicated by the solid line in FIG. 3B, when the output shaft 41 is pivoted by the motor 40 in a clockwise direction, the lower fin 23 pivots in the clockwise direction around the pivot shaft portion 23a. According to the rotation of the lower fin 23, the link coupling portion 23d of the lower fin 23 pivots in the clockwise direction and the link mechanism 30 moves downward. Then, the link coupling portion 21d of the upper fin 21 and the link coupling portion 22d of the middle fin 22 respectively coupled to the link mechanism 30 rotate in the clockwise direction, and the upper fin 21 and the middle fin 22 rotate. In this way, the postures of the upper fin 21, the middle fin 22, and the lower fin 23 are in the fully open state as indicated by two-dot chain line in FIG. 3B.

In this embodiment, as described above, the motor 40 outputs a driving force having the magnitude required to drive all of the fins 20 such that all of the fins 20 are pivoted by the link mechanism 30. The output shaft of the motor 40 is connected to the lower fin 23, and thus the output of the motor is transmitted to the lower fin 23 having highest rigidity.

The inventors have extensively studied on rigidity required for the fins 20 of the vehicular shutter device 1. The inventors have found that a large impact force acts on the fins 20 when the fins 20 collide with water droplets or mud to be scattered at the time of entrance of the vehicle into the puddle or the like. In a case of attempting to ensure rigidity necessary for the impact force, the thickness of the fin 20 tends to be thicker, and thus the opening ratio is reduced.

Therefore, the inventors have found as a result of further study that the water droplets or the mud are scattered from a lower side to an upper side and thus water droplets or mud having a large mass hardly reach the upper side. For this reason, the inventors have found that large water droplets or mud are easy to collide with the lower fin 23 located at the lowermost side, and large rigidity is required for the lower fin 23 located at the lowermost side.

Therefore, according to the vehicular shutter device of this embodiment as described above, the rigidity of the lower fin 23 located at the lowermost side is set to be larger than the rigidity of the upper fin 21 and the middle fin 22 other than that. Accordingly, since the rigidity of the lower fin 23, which is easy to collide with large water droplets or mud, is large, the fins 20 have little risk of being damaged even when the vehicle enters the puddle.

Furthermore, since only the rigidity of the lower fin 23 located at the lowest side is set to be larger than the rigidity of the upper fin 21 and the middle fin 22, the opening ratio is hardly reduced when the vehicular shutter device 1 is in the open state. Accordingly, as described above, when the thickness of the fin increases in the open state, the opening ratio is reduced. In this embodiment, however, since the rigidity of the upper fin 21 and the middle fin 22 is less than the rigidity of the lower fin 23, it is possible to design the thickness of the upper fin 21 and the middle fin 22 to be thinner than the thickness of the lower fin 23. Thus, the high opening ratio can be maintained.

In this way, according to the vehicular shutter device of this embodiment, it is possible to maintain the high opening ratio while ensuring the required rigidity.

According to this embodiment, the output shaft 41 of the motor 40 is connected to the lower fin 23 having the high rigidity as described above. Since the large driving force to be output by the motor 40 is received by the lower fin 23 having the highest rigidity, this is a reasonable configuration.

In the above-described embodiment, an example where the rigidity of the lower fin 23 is set to be larger than the rigidity of the upper fin 21 or the middle fin 22 in such a manner that the thickness is made large and the rib is provided is described, but the rigidity may be increased by various manners without being limited thereto. For example, the lower fin 23 may be formed of a material having large rigidity compared to the upper fin 21 and the middle fin 22. All of the fins 20 have the same thickness and the rib 23f may be provided only at the lower fin 23, or all of the fins 20 has the same shape and the thickness of the lower fin 23 may be set to be larger than that of the upper fin 21 and the middle fin 22.

With reference to FIGS. 5A to 5C, an example where the plurality of fins 20 are arranged in a straight line in the cross-section orthogonal to the axial direction of the pivot shaft portion is described, but the present invention is not limited thereto. For example, the plurality of fins 20 may be vertically arranged in a zigzag or may be vertically arranged in a circular arc shape in this cross-section.

In the above-described embodiment, an example where the pivot shaft portion is provided integrally with the plate portion (an example of the fin main body) and the shaft receiving portion 50 is provided to the frame 10 is described, but the pivot shaft portion may be provided to the frame 10 and the shaft receiving portion may be provided integrally with the plate portion.

The present application claims priority from Japanese Patent Application No. 2014-103290 filed on May 19, 2014 and Japanese Patent Application No. 2014-103291 filed on May 19, 2014, the entire contents of which are hereby incorporated by reference.

INDUSTRIAL APPLICABILITY

According to the invention, the vehicular shutter device is provided in which the sealing rate is high and the fins are supported with high rigidity.

REFERENCE SIGNS LIST

1: vehicular shutter device
10: frame (frame portion)
11: opening
12: inner peripheral surface
13: top wall
14: bottom wall
15: sidewalls
16: intermediate wall
20: fin
21: upper fin
21a: pivot shaft portion
21b: plate portion
22: middle fin
22a: pivot shaft portion
23: lower fin
23a: pivot shaft portion
23b: plate portion
30: link mechanism
40: motor
50: shaft receiving portion
51: accommodating space
52: insertion port

What is claimed is:
1. A vehicular shutter device configured to adjust the amount of air to be flowed into an inside from an outside surface a vehicle, comprising:
 a frame portion that is attached to the vehicle and includes an opening;
 a fin main body that is pivotably supported inside the frame portion to be pivotable around a pivot shaft portion extending in a horizontal direction; and
 a driving mechanism that pivots the fin main body between a fully open state and a fully closed state,
 wherein the pivot shaft portion is provided to one of the frame portion and the fin main body,
 wherein a shaft receiving portion is provided to an other of the frame portion and the fin main body to pivotably support the pivot shaft portion,
 wherein one of the pivot shaft portion and the shaft receiving portion is provided at a position offset from the fin main body having a plate shape,
 wherein the pivot shaft portion and the shaft receiving portion are located at both ends, in the horizontal direction of the fin main body,
 wherein the frame portion includes an intermediate wall provided at an intermediate part in the horizontal direction, inside the opening, and
 wherein one of the pivot shaft portion and the shaft receiving portion provided on the intermediate wall of the frame portion, is provided to pivotably support the other of the pivot shaft portion and the shaft receiving portion provided on fin main body.
2. The vehicular shutter device according to claim 1, wherein the shaft receiving portion includes:
 an accommodating space that pivotably accommodates the pivot shaft portion; and an insertion port that is formed to insert the pivot shaft portion into the accommodating space in such a manner that a part of a wall forming the accommodating space is cut out.

3. The vehicular shutter device according to claim 1, wherein the intermediate wall includes a pair of plate-shaped walls that are spaced from each other in the horizontal direction and extend in the vertical direction, and
wherein the pivot shaft portion or the shaft receiving portion located at the intermediate part in the horizontal direction is provided over the pair of plate-shaped walls.

4. The vehicular shutter device according to claim 1, wherein, in a cross-section orthogonal to an axial direction of the pivot shaft portion, the pivot shaft portion includes a long diameter and a short diameter, and
wherein the long diameter is larger than an opening width of the insertion port, and the short diameter is not orthogonal to an insertion-and-removal direction of the pivot shaft portion during a normal operation state in which the fin main body pivots between the fully open state and the fully closed state.

5. The vehicular shutter device according to claim 1, wherein the fin main body includes a cover that is located in front of the pivot shaft portion or the shaft receiving portion at the time of the fully open state to cover the pivot shaft portion or the shaft receiving portion.

6. The vehicular shutter device according to claim 1, wherein the vehicular shutter device comprises a vehicular grill shutter that is provided at a front of an engine room to adjust an amount of the air to be flowed into the engine room of the vehicle.

7. The vehicular shutter device according to claim 1, wherein a plurality of the fins are vertically arranged inside the frame portion, and
wherein a fin, located at the lowermost side in a vertical direction, among the plurality of the fins has higher rigidity than other fins.

8. The vehicular shutter device according to claim 7, wherein the fin located at the lowermost side has a plate shape, and
wherein, in a cross-section orthogonal to an axial direction of the pivot shaft portion, an intermediate portion of the fin located at the lowermost side protrudes in a thickness direction than both ends thereof.

9. The vehicular shutter device according to claim 7, further comprising:
a link mechanism that transmits a driving force of the driving mechanism to the plurality of the fins such that the plurality of fins are synchronously moved,
wherein the fin located at the lowermost side among the plurality of the fins is coupled to an output shaft of the driving mechanism, and the other fins are coupled to the link mechanism.

10. The vehicular shutter device according to claim 7, wherein the link mechanism includes:
a first link that is coupled to one end in the horizontal direction of a plurality of the fins; and
a second link that is coupled to the other end in the horizontal direction of the plurality of the fins.

11. The vehicular shutter device according to claim 1, wherein the pivot shaft portion and the shaft receiving portion, which are located at the both ends and the intermediate part, are located on a same axial between the fully open state and the fully closed state.

12. The vehicular shutter device according to claim 1, wherein the shaft receiving portion, which are located at the both ends and the intermediate wall, has a groove that is opened toward a front side of the vehicle.

13. The vehicular shutter device according to claim 1, wherein the shaft receiving portion provided on the frame portion is formed to protrude toward a front side of the vehicle, and
wherein the pivot shaft portion provided on the fin main body is formed to protrude toward a rear side of the vehicle.

14. The vehicular shutter device according to claim 1, wherein the pivot shaft portion provided on the frame portion is formed to protrude toward a front side of the vehicle, and
wherein the shaft receiving portion provided on the fin main body is formed to protrude toward a rear side of the vehicle.

15. The vehicular shutter device according to claim 5, wherein the cover protrudes from a rear face of the fin main body.

16. A vehicular shutter device, comprising:
a frame which is configured to be attached to a vehicle, the frame including an intermediate wall formed inside an opening of the frame at an intermediate part of the frame in a horizontal direction;
a fin that is pivotably connected to the intermediate wall of the frame;
a driving mechanism that pivots the fin between a fully open state and a fully closed state;
a pivot shaft portion formed on one of the intermediate wall and the fin, the pivot shaft portion extending in the horizontal direction around which the fin is pivotable; and
a shaft receiving portion formed on the other of the intermediate wall and the fin, and pivotably supporting the pivot shaft portion.

17. The vehicular shutter device of claim 16, wherein the fin comprises a plate-shaped fin, and one of the pivot shaft portion and the shaft receiving portion is provided at a position offset from the plate-shaped fin.

18. The vehicular shutter device of claim 16, wherein the pivot shaft portion and the shaft receiving portion are located at both ends in the horizontal direction of the fin.

* * * * *